United States Patent [19]

Kasugayama et al.

[11] 4,419,678

[45] Dec. 6, 1983

[54] INK JET RECORDING APPARATUS

[75] Inventors: Yukio Kasugayama, Yokohama; Koji Terasawa, Fuchu; Yoshihumi Hattori, Kawasaki, all of Japan

[73] Assignee: Canon Kabushiki Kaisha, Tokyo, Japan

[21] Appl. No.: 195,350

[22] Filed: Oct. 9, 1980

[30] Foreign Application Priority Data

Oct. 17, 1979 [JP] Japan ............................... 54-132824

[51] Int. Cl.[3] ............................................ G01D 15/16

[52] U.S. Cl. ................................................ 346/140 R

[58] Field of Search ........ 346/140 PD, 140 R, 140 IJ, 346/75

[56] References Cited

U.S. PATENT DOCUMENTS 3,140,912 7/1964 Davis et al. ......................... 346/140
3,278,942 10/1966 Bowditch ........................ 346/140 R
3,482,258 12/1969 Steen ............................... 346/140 R
3,708,798 1/1973 Hildenbrand et al. ....... 346/140 PD
3,771,165 11/1973 Kurimoto et al. ........... 346/140 PD
3,953,862 4/1976 Amberntsson et al. ..... 346/140 PD
4,202,267 5/1980 Heinzl et al. .................. 346/140 R

*Primary Examiner*—G. Z. Rubinson
*Assistant Examiner*—W. J. Brady
*Attorney, Agent, or Firm*—Fitzpatrick, Cella, Harper & Scinto

[57] ABSTRACT

An ink jet recording apparatus has a recording liquid container storing recording liquid therein, a recording head which is supplied with the recording liquid from the container and which discharges the recording liquid to effect printing on printing paper, and a carriage on which the recording head and the recording liquid container are mounted. The recording head is secured to the carriage. The apparatus further has a recording liquid supply member having one opening connected to the recording head. The other opening of the recording liquid supply member is tightly insertable into the recording liquid container. By inserting the recording liquid supply member into the recording liquid container, the recording liquid is supplied from the recording liquid container to the recording head through the recording liquid supply member.

3 Claims, 11 Drawing Figures

INK JET RECORDING APPARATUS

BACKGROUND OF THE INVENTION

1. Field of the Invention

This invention relates to an ink jet recording apparatus, and more particularly to an ink jet recording apparatus in which a recording liquid container is removable with respect to a carriage.

2. Description of the Prior Art

In the conventional ink jet recording apparatus using an open system supply mechanism, as shown in FIG. 1 of the accompanying drawings, a supply path 2 is connected to one end of a recording head 1 comprising a piezoelectric device or the like to receive the supply of recording liquid 4 from a recording liquid container 3. The upper surface of the container 3 is formed with a vent hole 5 for maintaining the interior of the container 3 always at the atmospheric pressure. The recording liquid 4 in the container 3 always reaches the tip end of the recording head 1 through the supply path 2 and, in response to an electrical signal applied to the piezoelectric device of the recording head 1, liquid drops 6 are discharged from the tip end, namely, the discharge orifice 1A, of the recording head 1, whereby characters or the like are printed on printing paper. The decrease of the recording liquid discharged as the liquid drops 6 is sucessively supplemented from the container 3 through the supply path due to the surface tension of the discharge orifice 1A of the recording head 1 and the difference in level between the recording liquid in the container 3 and the recording head 1 and thus, the recording liquid 4 always reaches the discharge orifice 1A of the recording head 1.

The conventional ink jet recording apparatus of such type suffers from the following problems. That is, where the object into which the ink jet recording apparatus is incorporated is a portable desk-top calculator or a small typewriter, if the apparatus body is inclined during the carrying of the calculator or the typewriter, the difference in level of the recording liquid between the container 3 and the discharge orifice 1A sometimes is not maintained at the proper value because there is a certain degree of distance between the container 3 and the tip end of the recording head 1. In such case, the meniscus of the recording liquid formed by the discharge orifice 1A may retreat inwardly of the supply path 2 or the recording liquid may leak from the discharge orifice 1A. When the meniscus has retreated, it is necessary to recover it as by applying a pressure from the container 3 side and, when the recording liquid has leaked, it contaminates the interior of the apparatus. Such recovery of the meniscus during each transportation or the leakage of the recording liquid in the interior of the apparatus is very awkward to the operator and not preferable.

Also, when vibration or shock is imparted to the apparatus or when the recording head 1 strikes against the printing end portion at high speed, the aforementioned leakage of the recording liquid of the retreat of the meniscus is more liable to occur. That is, when vibration or shock is imparted to the apparatus body or the recording head 1 or the supply path 2, the meniscus at the discharge orifice 1A may be destroyed thereby, so that it may leak as liquid drops to the outside or may retreat inwardly of the supply path 2. As this time, where there is an improper difference in level between the container 3 and the recording head 1, the meniscus is liable to be destroyed and, once it is destroyed, it cannot readily be restored to its original state and the liquid continuously leaks to the outside or the meniscus retreats inwardly of the supply path 2 to a position whereat the balance between the level difference and the surface tension can be kept. Such vibration or shock always occurs where the recording is effected by reciprocating the recording head 1 relative to a recording medium, for example, printing paper, and therefore the presence of an improper level difference between the container 3 and the recording head 1 is fatal. Also, in order that the meniscus may not be destroyed, the speed of reciprocal movement of the recording head 1 is limited and thus, high-speed printing is difficult.

Another problem occurs when bubbles have come into the supply path 2. That is, if bubbles are present only in the supply path 2, the discharging performance will not be hindered, whereas when the bubbles have moved to the recording head 1 with the movement of the recording liquid, the discharge becomes unsatisfactory. Especially, in an apparatus utilizing the deforming action of an electo-mechanical converter member as the discharge drive source of the recording head 1, the energy created by deformation is absorbed into bubbles and such energy is not transmitted to the recording liquid, but the discharge of the recording liquid from the recording head 1 is completely stopped, thus making continuous stable printing difficult.

Applicant has previously proposed an ink jet recording apparatus which intends to overcome the problems in such open system supply mechanism.

FIGS. 2A and 2B of the accompanying drawings show an example of the proposed ink jet recording apparatus. Reference numeral 10 designates a recording head, and the recording head 10 and a recording liquid container 11 are made integral with each other and contained in a single container 12. The container 12 is fixed to a carriage 13 which in turn is slidably mounted on a shaft 14 and effects the printing while moving along the widthwise direction of printing paper. The recording head 10 can comprise a piezoelectric device 15, a nozzle portion 16, a discharge orifice 17 and a supply tube 18. This supply tube 18 extends from the recording head body to the interior of the recording liquid container 11 while assuming an L-shape, so that the recording liquid 19 in the recording liquid container 11 is directed into the recording head 10 through the supply tube 18. Also, this supply tube 18 is fixed to a wall 20 covering the upper portion of the container 12, so that the supply tube 18 is not moved by vibration or shock. Designated by 21 is a vent hole of the recording liquid container 11 for maintaining the pressure in the tank 11 always at the atmospheric pressure. Designated by 22 and 23 are connectors for supplying an electrical signal from the outside to the piezoelectric device 15 forming the recording head 10. The piezoelectric device 15 and the connectors 22, 23 are connected by signal lines, not shown. Design is made such that the distance between the discharge orifice 17 provided at the end of the nozzle portion 16 and the distal end 18A of the supply tube 18 is set to a suitable distance.

According to the ink jet recording apparatus constructed as described above, the recording head 10 and the recording liquid container 11 are contained as a unit in the single container 12, and the supply tube 18 for supplying the recording liquid to the recording head 10 is determined to an appropriate length and inserted into the recording liquid container 11 and thus, the recording liquid never leaks from the recording head 10 or the meniscus in the discharge orifice 17 never retreats inwardly of the supply tube 18 due to the inclination, vibration or shock as previously described.

However, it has been found that such an ink jet recording apparatus still suffers from problems.

That is, in the case of a compact calculator in which high printing speed is required, the reciprocally moved drive carriage portion should desirably be light in weight from the viewpoint of the performance of the drive motor and therefore, the recording liquid stored in the recording liquid container is restricted in weight. Accordingly, in FIGS. 2A and 2B, the volume of the recording liquid container 11 must be minimized to provide a suitable weight of the container and realize high-speed printing. However, if the volume of the recording liquid container 11 is reduced, the recording liquid in that container will be exhausted in a short time and thus, the container 12 containing the recording head 10 and the recording liquid container 11 as a unit must be frequently replaced by a new one, but undesirably this means a higher maintenance expense in the case of desk top calculators provided with a printer or typewriters directed to individual users, because the recording head is expensive.

SUMMARY OF THE INVENTION

It is an object of the present invention to provide an inexpensive ink jet recording apparatus.

It is another object of the present invention to provide an ink jet recording apparatus which is capable of high-speed printing.

It is still another object of the present invention to make the recording liquid container removable with respect to the carriage.

It is yet still another object of the present invention to enable the mounting and dismounting of the recording liquid container to be easily accomplished.

The invention will become fully apparent from the following detailed description thereof taken in conjunction with the accompanying drawings.

DESCRIPTION OF THE PREFFERED EMBODIMENT

Figure 1:
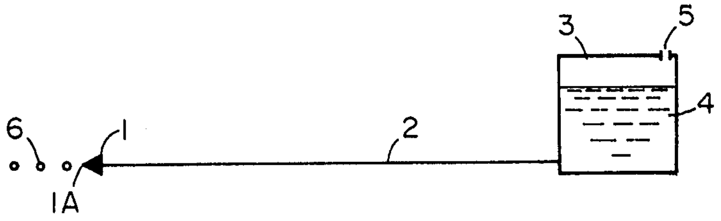
FIG. 1 PRIOR ART
FIG. 1 schematically shows the construction of the ink jet recording apparatus according to the prior art.
Figure 2A:
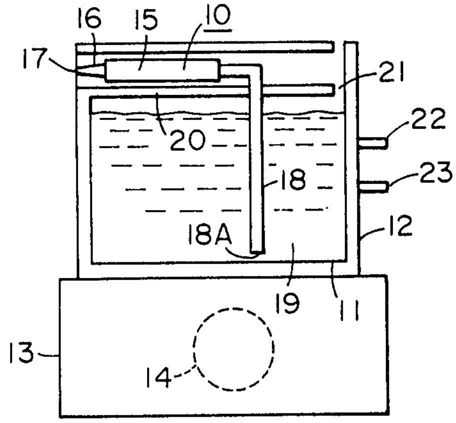
FIG. 2A PRIOR ART
FIGS. 2A and 2B show the construction of an ink jet recording apparatus already proposed.
Figure 2B:
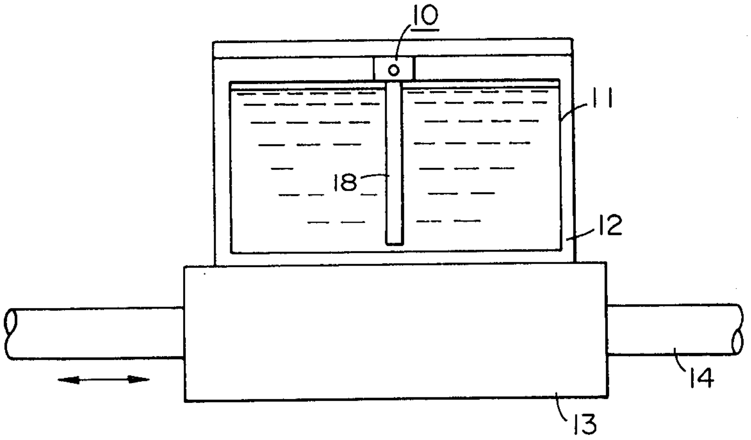
FIG. 2B PRIOR ART
Figure 3:
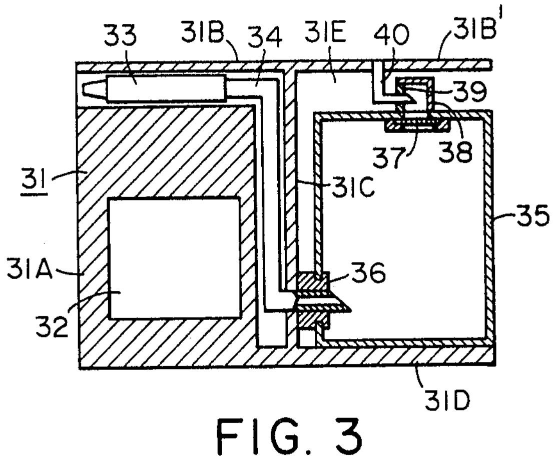
FIG. 3 shows the construction of an embodiment of the ink jet recording apparatus according to the present invention.
Figure 4:
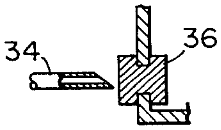
FIGS. 4 and 5 are schematic views showing the blind plug of the ink jet recording apparatus shown in FIG. 3.

FIG. 3 shows an example in which the recording liquid container in the present invention is mounted on a carriage from the rear of the carriage (the right-hand side in FIG. 3) which is opposite to printing paper. In FIG. 3, reference numeral 31 designates the carriage slidable on a shaft 32, reference numeral 33 denotes a recording head, and reference numeral 34 designates a supply tube as a recording liquid supply member. The carriage 31 has a carriage body 31A slidable with resepct to the shaft 32, an upper wall 31B forming between it and the upper surface of the body 31A a gap for containing the recording head 33 therein, and a partition wall 31C connected to the upper wall 31B and forming a gap for containing the supply tube 34 therein. Further, a recording liquid container containing chamber 31E is formed by a bottom wall 31D extending rearwardly thereof from the bottom surface portion of the carriage body 31A, an extension 31B' of the upper wall 31B which extends rearwardly of the carriage, and the partition wall 31C. The recording head 33 is secured to the upper surface of the carriage body 31A. One end of the supply tube 34 for supplying recording liquid to the recording head 33 is connected to the end of the recording head 33. The supply tube 34 is directed from the upper surface of the carriage body 31A along the back side thereof. The other end of the supply tube 34 is bent so as to be parallel to the bottom wall 31D. The other end of the supply tube 34 is severed obliquely so as to form a wedge-shaped opening. Reference numeral 35 designates a recording liquid container which is removably contained in the containing chamber 31E formed rearwardly of the carriage. As shown in FIG. 4, a blind plug 36 formed of an elastic material is mounted in the lower portion of that side of the recording liquid container which is opposed to the partition wall 31C.

Figure 5:
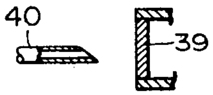

On the other hand, a vent filter 37 for maintaining the interior of the container 35 always at the atmospheric pressure is mounted on the upper surface of the container 35. When the container 35 is not mounted in the containing chamber 31E of the carriage 31, it is necessary to shield the recording liquid in the container 35 from the atmosphere and prevent vaporization and degeneration of the recording liquid. Accordingly, an atmosphere-communicating portion 38 is provided above the vent filter 37 and, as shown in FIG. 5, an atmosphere-communicating blind plug 39 formed of an elastic material is mounted on one side wall (the left side wall in FIG. 3) of the atmosphere-communicating portion 38 so that, when the container 35 is not mounted in the containing chamber 31E of the carriage 31, the recording liquid in the container 35 is shielded from the atmosphere. An atmosphere-communicating tube 40 adapted to pass through the blind plug 39 when the container 35 has been mounted to the carriage 31 and to communicate the interior of the container 35 with the atmosphere is mounted to the upper wall 31B' of the carriage 31.

In FIG. 3, when the container 35 is forced into the containing chamber 31E of the carriage 31 from right to left, the other end portion of the supply tube 34 is inserted into the blind plug 36 to form a recording liquid outlet while, at the same time, the atmosphere-communicating tube 40 passes through the blind plug 39. Thus, the container 35 is mounted in the carriage 31 integrally therewith, and the recording liquid is supplied to the recording head 33 through the supply tube 34 passed through the blind plug 36 of elastic material, and the interior of the container 35 is communicated with the atmosphere through the atmosphere-communicating tube 40 passed through the blind plug 39. Of course, the vent filter 37 may be replaced by a small hole which can communicate with the atmosphere.

Figure 6:
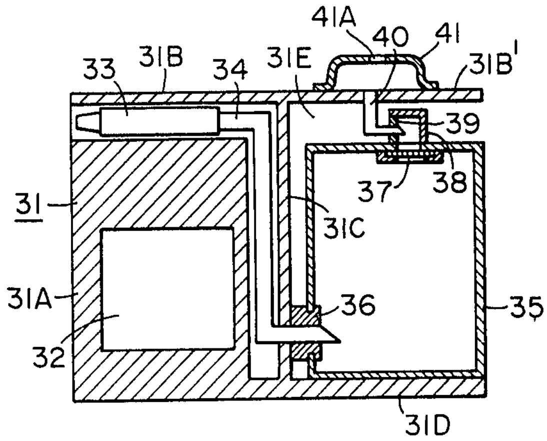
FIG. 6 shows the construction of another embodiment in which a diaphragm is added to the apparatus of FIG. 3.

If, as shown in FIG. 6, a diaphragm 41 is provided on the upper wall 31B' so as to cover the atmosphere-communicating tube 40, even when bubbles or foreign materials enter into the interior of the recording head 33 to cause unsatisfactory discharge, the diaphragm 41 may be depressed with the hole 41A of the diaphragm closed by a finger, whereby the pressure in the container 35 may be increased to cause the recording liquid to be forcibly discharged from the recording head 33, thus remedying the unsatisfactory discharge.

Figure 7:
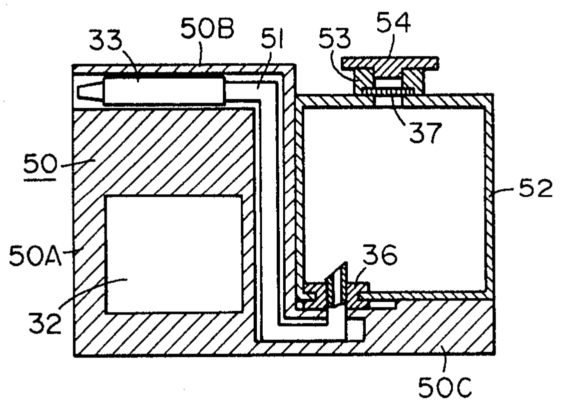
FIGS. 7 and 9 show the construction of further embodiments of the present invention.

FIG. 7 shows another embodiment of the ink jet recording apparatus of the present invention in which the recording liquid container is mounted to the carriage from thereabove. In FIG. 7, parts similar to those of FIG. 3 are given similar reference characters and need not be described. In FIG. 7, reference numeral 50 designates the carriage, and reference character 50A denotes a carriage body slidable with respect to the shaft 32. As in the case of FIG. 3, a recording head 33 is secured to the upper surface of the carriage body 50A. Designated by 51 is a supply tube as a recording liquid supply member having one end connected to the recording head 33. This supply tube 51 is downwardly directed from the upper portion of the carriage body 50A along the back side of the body 50A which is opposite to printing paper. The other end portion of the supply tube 51 is formed into an L-shape, and an upwardly rising wedge-shaped opening is formed at the fore end of the supply tube. The recording head 33 and the supply tube 51 are contained in a staircase-like chamber formed between the outer wall 50B of the carriage and the carriage body 50A. The lower portion of the carriage body 50A is projected rearwardly of the carriage to form a container supporting table 50C. The container supporting table 50C is formed with a hole through which the wedge-shaped end of the supply tube is projected vertically upwardly. Designated by 52 is a recording liquid container, and a blind plug 36 as a recording liquid outlet formed of an elastic material similar to what has been described above is mounted in the bottom surface of the recording liquid container 52. The upper surface of the container 52 is provided with a cylindrical atmosphere-communicating portion 53 under which a vent filter 37 for maintaining the interior for the container 52 always at the atmospheric pressure is disposed. This communicating portion 53 has a plug 54 for shielding the recording liquid from the atmosphere when the container 52 is not mounted to the carriage 50. When the thus constructed recording liquid container 52 is mounted on the container supporting table 50C, the other end of the supply tube 51 is inserted into the blind plug 36 to form a recording liquid outlet. If the plug 54 is removed to communicate the interior of the container 52 with the atmosphere after the container 52 has been so mounted to the carriage 50, the recording liquid will be supplied to the recording head through the supply tube 51.

Figure 8:
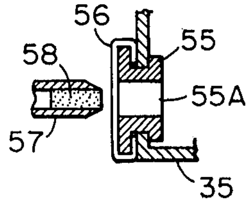
FIG. 8 is a schematic view showing another example of the recording liquid outlet shown in FIGS. 3, 6 and 7.

FIG. 8 shows another example of the blind plug 36 and the fore end portion of the supply tube 34, 51 shown in FIGS. 3, 4, 6 and 7. Designated by 55 is a recording liquid outlet formed of an elastic material and having a through-hole 55A at the center thereof, and in FIG. 8, it is shown as being mounted in a side wall of the container 35. One end (the left end in FIG. 8) of the outlet 55 is covered with a film 56 which may comprise an aluminum foil or any of various laminated members, so as to envelop the recording liquid in the container. Designated by 57 is the supply tube, and in the end portion thereof, there is inserted a member 58 which can be impregnated with the recording liquid, for example, a member formed of a high molecular material such as polyethylene or polypropylene. In the case of the present embodiment, the supply tube 57 is inserted into the outlet 55 to break the film 56 and thereby permit the recording liquid in the container to be supplied to the recording head through the supply tube 57. According to the construction shown in FIG. 8, the member 58 is impregnated with the recording liquid during the interchange of the container, so that no bubble enters into the recording head through the supply tube 57 and in addition, entry of dust into the recording head can be prevented.

Figure 9:
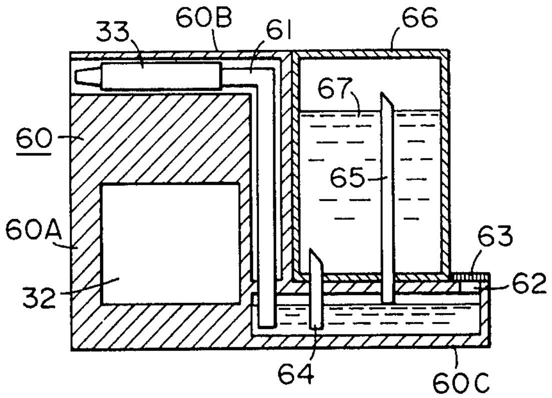

FIG. 9 shows still another embodiment of the ink jet recording apparatus of the present invention. Designated by 60 is a carriage, and denoted by 60A is a carriage body slidable with respect to a shaft 32. As in the case of FIG. 3, a recording head 33 is secured to the upper surface of the carriage body 60A. Reference numeral 61 designates a supply tube having one end connected to the recording head 33, and this supply tube 61 is downwardly directed from the upper portion of the carriage body 60A along the back side of the body 60A which is opposite to printing paper. The recording head 33 and the supply tube 61 are contained in a staircase-like chamber formed between the outer wall 60B of the carriage and the carriage body 60A, the staircase-like chamber being connected to an ink reservoir 60C provided in the back side near the bottom surface of the carriage body 60A. One end (the right end in FIG. 9) of the upper wall of the ink reservoir 60C is formed with a vent hole 62 for maintaining the interior of the ink reservoir 60C at the atmospheric pressure, and a vent filter 63 is mounted on the upper portion of the vent hole. The supply tube 61 is inserted to the neighborhood of the bottom surface of the ink reservoir 60C. Further, a recording liquid outlet tube 64 and an atmosphere-communicating tube 65 extend through the upper wall of the ink reservoir 60C. The recording liquid outlet tube 64, the atmosphere-communicating tube 65, the ink reservoir 60C and the supply tube 61 together constitute a recording liquid supply member. The tube 64 is made shorter than the tube 65, and the lower end of the tube 64 is disposed near the bottom surface of the ink reservoir 60C and the upper end of the tube 64 is projected upwardly through the upper wall of the ink reservoir 60C. The lower end of the tube 65 is disposed slightly below the inner side of the upper wall of the ink reservoir 60C, and the upper end of the tube 65 is disposed above the upper end of the tube 64. Designated by 66 is a recording liquid container formed of an elastic material and filled with recording liquid 67.

When the container 66 is mounted on the upper surface of the ink reservoir 60C in such a manner that the container 66 is inserted over the tubes 64 and 65 from above the carriage 60, the recording liquid 67 in the container 66 flows into the ink reservoir 60C through the tube 64. When the level of the recording liquid in the ink reservoir 60C reaches the lower end of the tube 65 as shown in FIG. 9, the interior of the container 66 is shielded from the atmosphere and therefore, the outflow of the recording liquid into the ink reservoir 60C stops and thus, the recording liquid never overflows from the ink reservoir 60C. According to this embodiment, the entire container 66 can be formed of an elastic material such as rubber and therefore, no special consideration need be given to the recording liquid outlet and the atmosphere-communicating portion and the interchange is easy to carry out and reduction in cost can be achieved.

Figure 10:
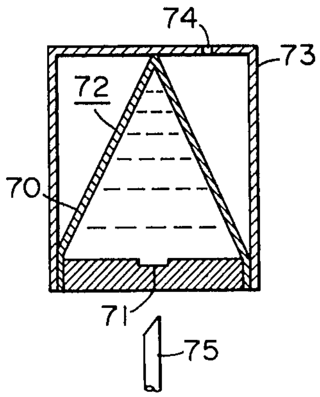
FIG. 10 is a schematic view showing another example of the recording liquid container in the present invention.

FIG. 10 shows yet still another embodiment of the recording liquid container in the present invention. Designated by 70 is flexible bag formed of any of various plastics film and a tarminated member of plastics or metal foil such as aluminum foil and plastics film. An elastic member 71 is secured to the opening portion of the bag 70 (in FIG. 10, the lower end of the bag 70) to form a bag-like container 72 which may be filled with recording liquid. Denoted by 73 is a cover for protecting the container 72. The upper surface of the cover 73 is formed with a vent hole 74 for maintaining the interior of the cover 73 always at the atmospheric pressure.

The thus constructed recording liquid container 72 is inserted over the needle-like end of a supply tube 75 connected to a recording head, whereby the container 72 is mounted to a carriage (not shown). In the present embodiment, as the recording liquid is decreased by being supplied to the recording head, the bag-like container 72 is correspondingly deformed to cope with the decrease of the recording liquid. The bag-like container of this type eliminates the necessity of providing a recording liquid outlet and an atmosphere-communicating portion and therefore, the interchange is easy to carry out and reduction in cost can be achieved.

According to the present invention, as has been described above, a recording liquid container of necessary minimum volume is designed such that it can be removably mounted with respect of a carriage by a simple construction and with great ease and thus, it enables high-speed printing and also, as compared with the interchange of the conventional recording liquid container which has involved the interchange of the expensive recording head, the interchange of the recording liquid container can be accomplished at a very low cost and with great ease. Thus, the present invention can provide an ink jet recording apparatus suited for use with compact calculators or typewriters directed to individual users.

What we claim is:

1. An ink jet recording apparatus comprising:

recording means for discharging recording liquid in response to an electrical signal;

a supply tube, having a tip end, for feeding the recording liquid to said recording means; and recording liquid reservoir means for storing the recording liquid therein, said reservoir means comprising a wall surface, a first elastic blind portion provided in said wall surface for receiving said tip end of said supply tube for insertion thereinto, an atmosphere communicating member, and a second elastic blind portion provided in said wall surface for receiving said atmosphere communicating member for insertion thereinto to communicate between the interior of said reservoir means and the atmosphere, and upon said atmosphere communicating member being inserted into said second blind position, said reservoir means further comprising two chambers for preventing leakage of the recording liquid to the outside thereof.

2. An ink jet recording apparatus according to claim 1, further comprising a vent filter for dividing the interior of said recording liquid reservoir into said two chambers and preventing passage of the recording liquid therethrough.

3. An ink jet recording apparatus comprising:

a recording liquid reservoir portion for storing the recording liquid and having an upper wall;

a first tube and a second tube projected upwardly through said upper wall and arranged with a lower end of the first tube disposed below that of the second tube within said reservoir portion;

recording means for discharging the recording liquid from said recording liquid reservoir portion from a forward end thereof and having a supply tube inserted into the interior of said recording liquid reservoir portion; and a recording liquid container of tightly sealed construction, said container mounted on an upper surface of said upper wall of said recording liquid reservoir portion, with said first and said second tubes inserted into the interior thereof for supplying recording liquid to said recording liquid reservoir portion.

* * * * *